Jan. 15, 1946.      G. H. PARKER      2,393,183
VEHICLE SUSPENSION
Filed Feb. 14, 1944      6 Sheets-Sheet 1
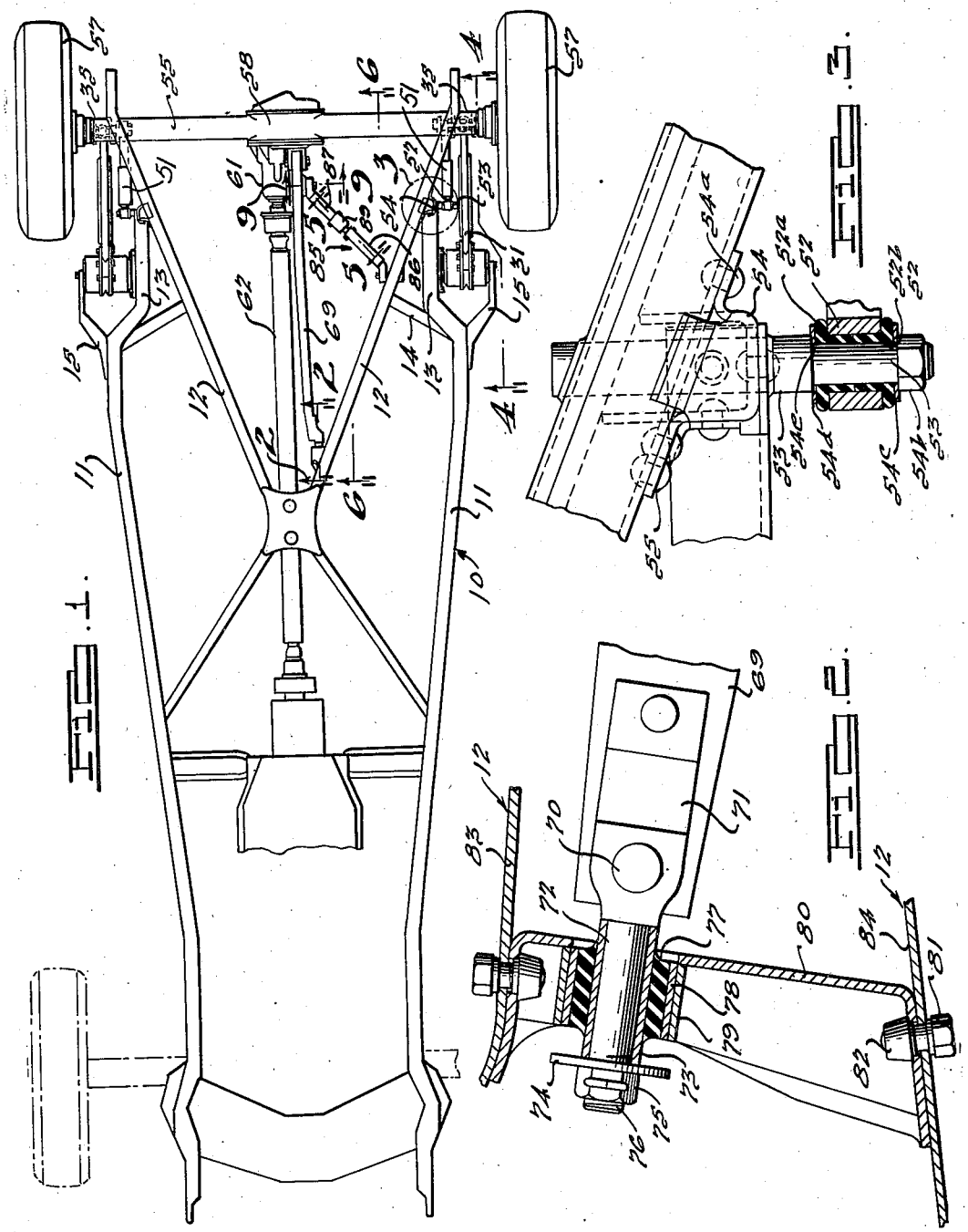
INVENTOR
Glenn H. Parker.
BY Harness and Harris
ATTORNEYS.

Jan. 15, 1946.  G. H. PARKER  2,393,183
VEHICLE SUSPENSION
Filed Feb. 14, 1944  6 Sheets-Sheet 2
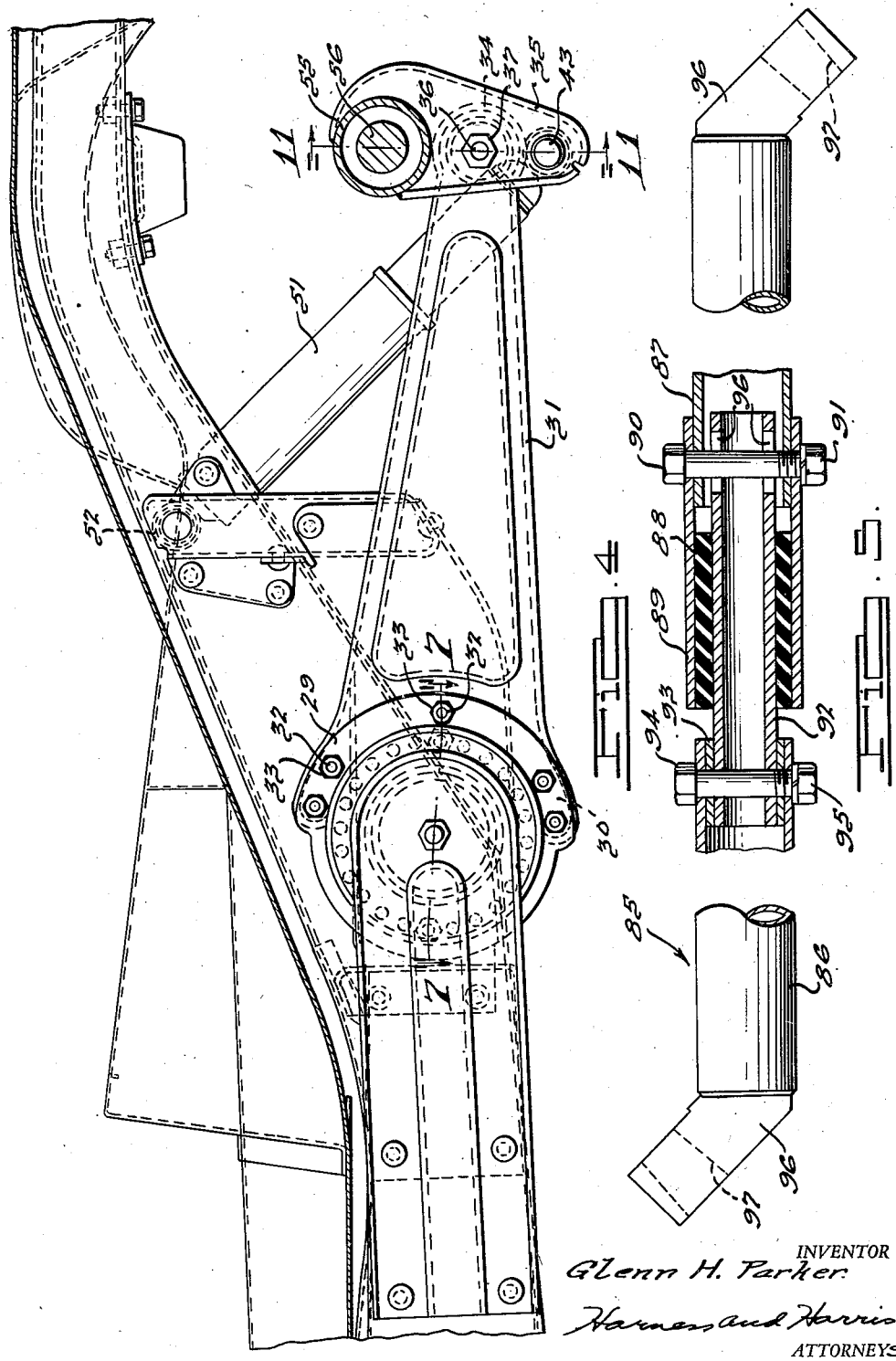
INVENTOR
Glenn H. Parker.
Harness and Harris
ATTORNEYS.

Jan. 15, 1946.  G. H. PARKER  2,393,183
VEHICLE SUSPENSION
Filed Feb. 14, 1944   6 Sheets-Sheet 3
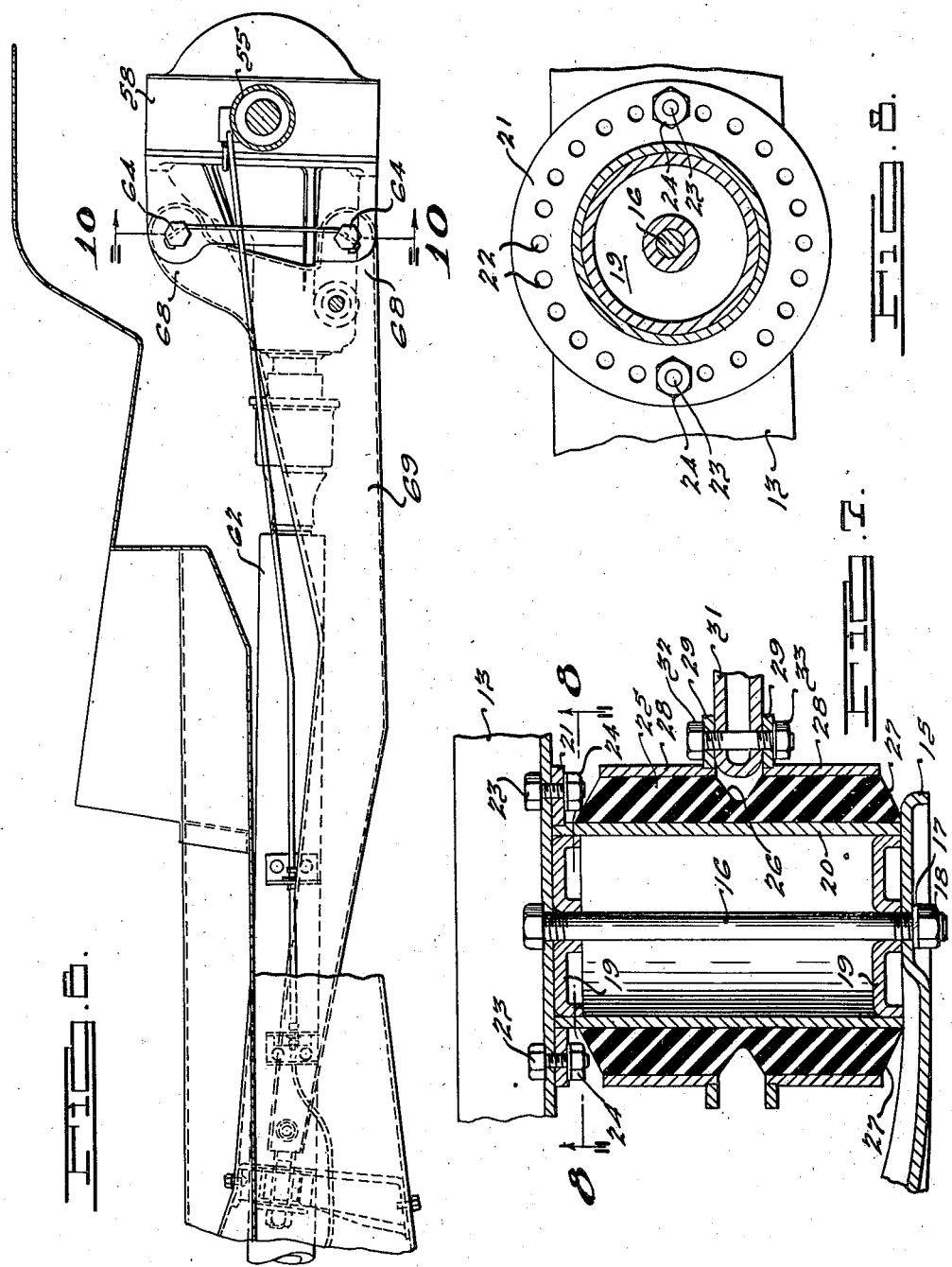
INVENTOR
Glenn H. Parker
BY Harness and Harris
ATTORNEYS.

Jan. 15, 1946.   G. H. PARKER   2,393,183
VEHICLE SUSPENSION
Filed Feb. 14, 1944   6 Sheets-Sheet 4
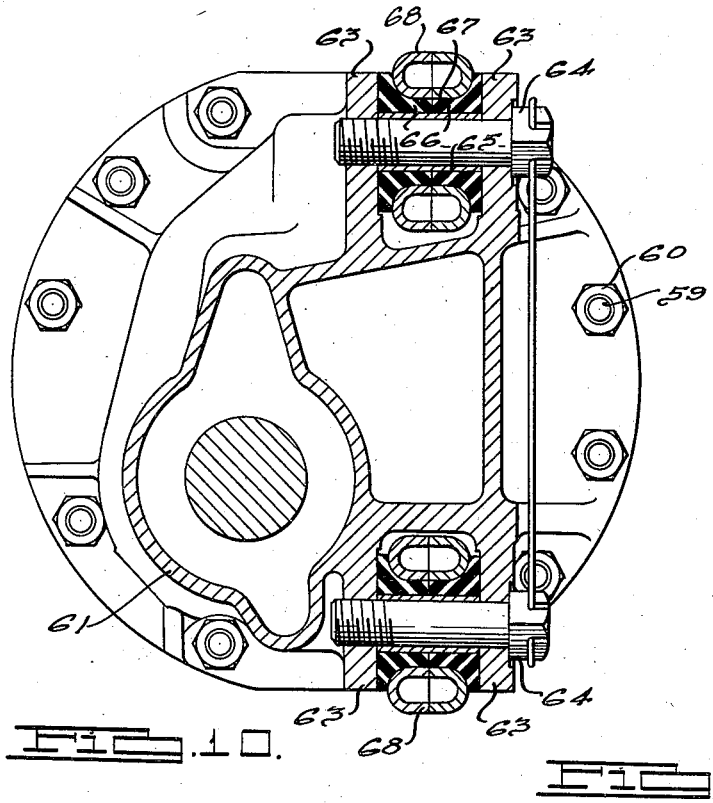
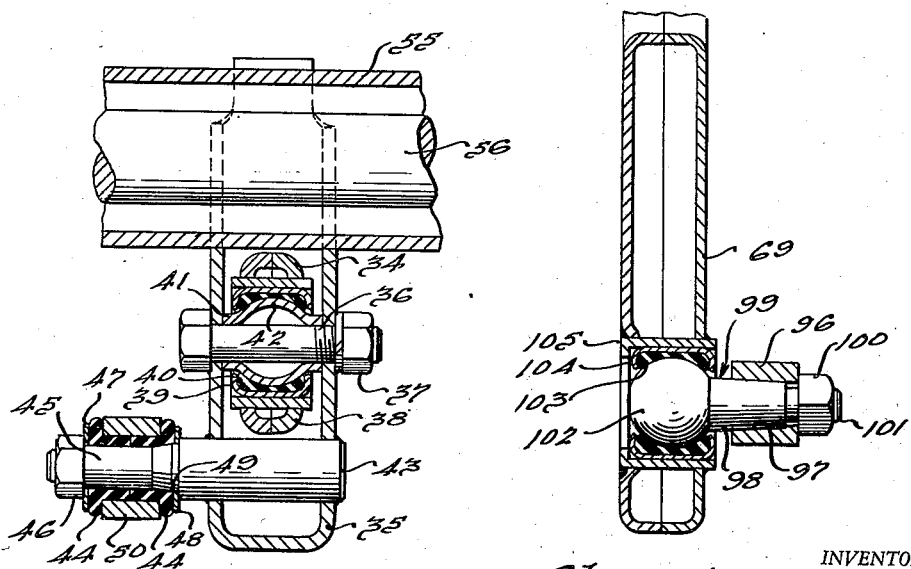
INVENTOR
Glenn H. Parker.
BY Harness and Harris
ATTORNEYS.

Jan. 15, 1946.        G. H. PARKER        2,393,183
VEHICLE SUSPENSION
Filed Feb. 14, 1944        6 Sheets-Sheet 5
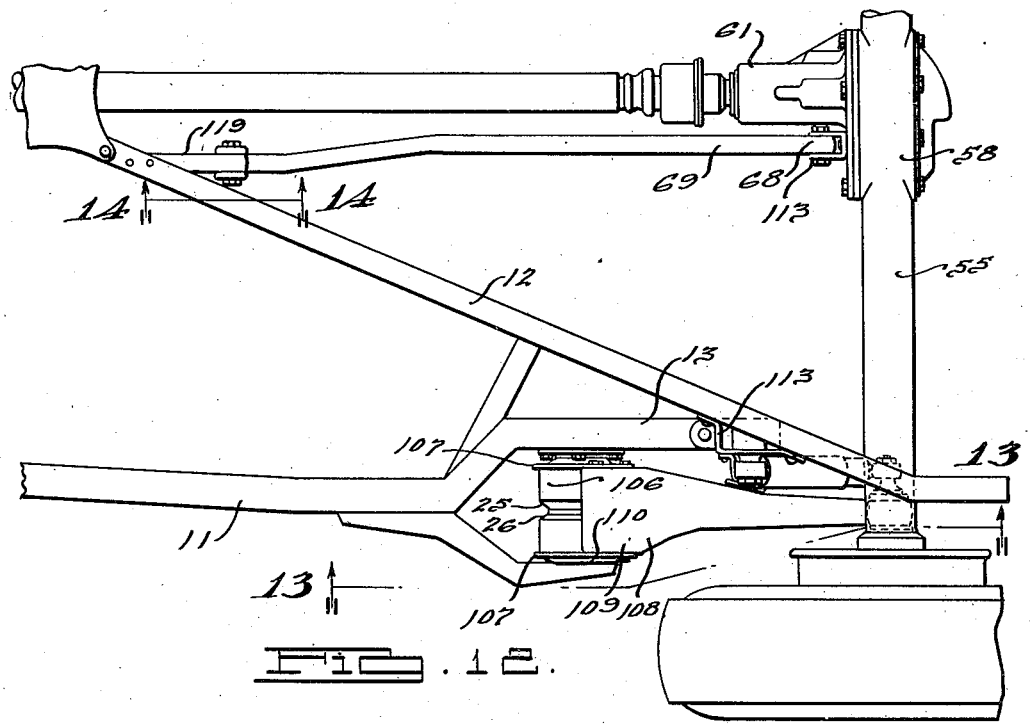
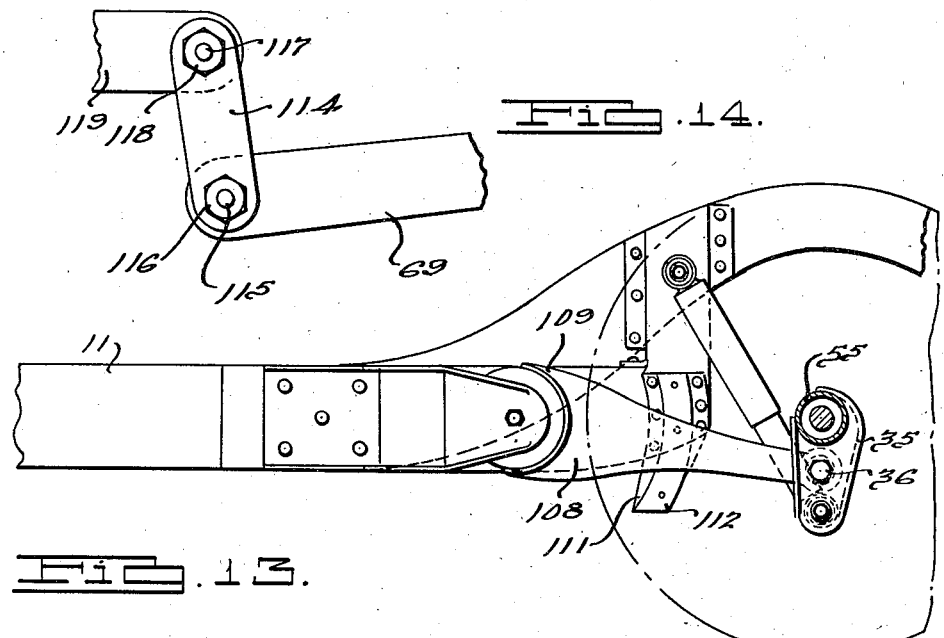
INVENTOR
Glenn H. Parker.
BY
Hamer and Harris
ATTORNEYS Jan. 15, 1946.   G. H. PARKER   2,393,183
VEHICLE SUSPENSION
Filed Feb. 14, 1944   6 Sheets-Sheet 6
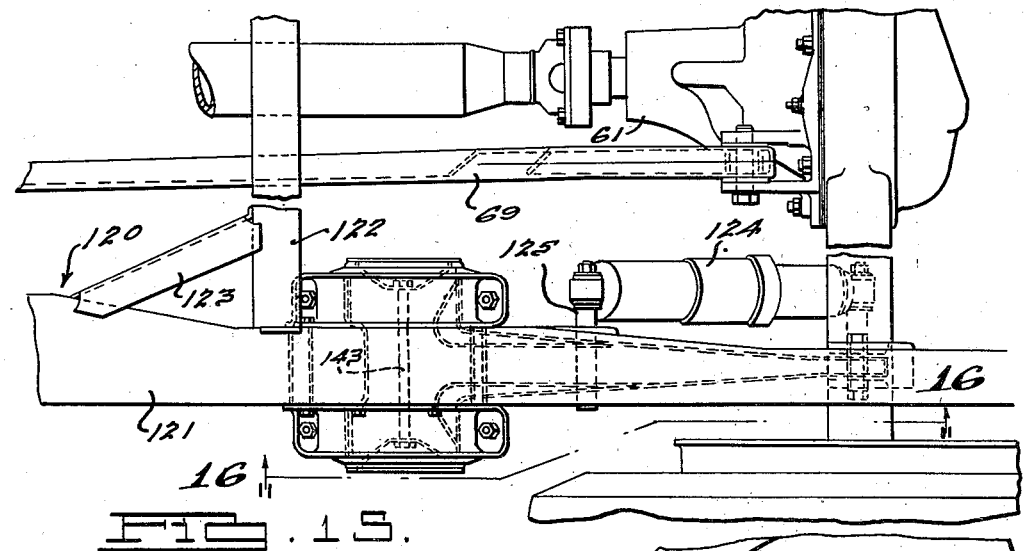
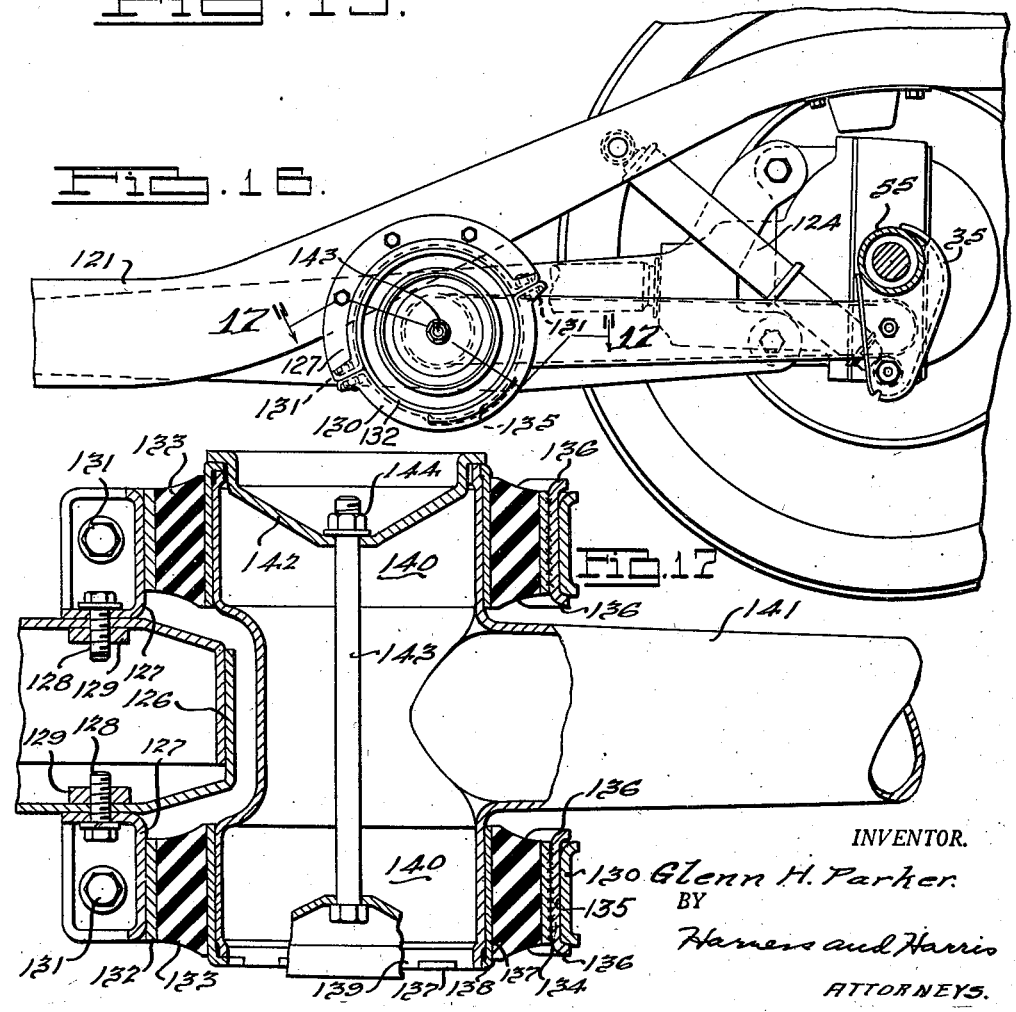
INVENTOR.
Glenn H. Parker.
BY
Harris and Harris
ATTORNEYS.

Patented Jan. 15, 1946

2,393,183

UNITED STATES PATENT OFFICE 2,393,183

VEHICLE SUSPENSION

Glenn H. Parker, Royal Oak, Mich., assignor to Chrysler Corporation, Highland Park, Mich., a corporation of Delaware Application February 14, 1944, Serial No. 522,279

31 Claims. (Cl. 180—71)

This invention relates to the mounting of a motor-vehicle frame. More specifically it relates to the connection of a motor-vehicle frame to a rear-axle housing.

Constructions are known that involve the use of arms mounted at one end on a motor-vehicle frame by rubber-spring means and connected at the other to an axle housing. In some instances the arms were connected to the axle housing below its centerline. The drawback with the use of these arms has been that there is too great a strain placed upon the connections between the arms and the axle housings. Particularly, when the connections are below the centerline of the axle housing, the forward force exerted through the axle causes the axle housing to twist about its connection with the arms. Moreover, in constructions heretofore known involving the aforementioned arms the rubber-spring means mounting the arms upon the vehicle frame has had certain disadvantages.

The present invention overcomes the disadvantages mentioned by, among other things, employing a torque member connected to the axle housing and the frame and by the use of rubber-spring means of certain forces serving as connections for the arms. Special connections or joints between the parts also serve to avoid the disadvantages.

An object of the present invention is to provide an improved mounting for a vehicle frame.

A further object is the provision of improvements in the connection of a vehicle frame to a housing for a live rear axle.

Another object is to provide an improved rubber spring means for mounting a vehicle frame.

Still another object is to improve the rubber-spring mounting upon a vehicle frame of arms connected to a housing for the rear axle.

A still further object is the provision, in an arrangement involving arms connected to a rear axle housing and mounted upon a vehicle frame by rubber spring means, of auxiliary means tying the frame and the rear-axle housing for enabling the arms to cooperate better with the axle housing and the vehicle frame.

Other objects will appear from the disclosure.

In the drawings,

Fig. 1 is a plan view of an automobile chassis embodying the novel features of the present invention;

Fig. 2 is a sectional view taken on the line 2—2 of Fig. 1;

Fig. 3 is an enlarged view, partially in section, of the portion contained within the circle 3 of Fig. 1;

Fig. 4 is a sectional view taken on the line 4—4 of Fig. 1;

Fig. 5 is a sectional view taken on the line 5—5 of Fig. 1;

Fig. 6 is a sectional view taken on the line 6—6 of Fig. 1;

Fig. 7 is a sectional view taken on the line 7—7 of Fig. 4;

Fig. 8 is a sectional view taken on the line 8—8 of Fig. 7;

Fig. 9 is a sectional view taken on the line 9—9 of Fig. 1;

Fig. 10 is a sectional view taken on the line 10—10 of Fig. 6;

Fig. 11 is a sectional view taken on the line 11—11 of Fig. 4;

Fig. 12 is a plan view of a portion of a chassis embodying a modified form of the present invention;

Fig. 13 is a sectional view taken on the line 13—13 of Fig. 12;

Fig. 14 is a sectional view taken on the line 14—14 of Fig. 12;

Fig. 15 is a plan view of a portion of a chassis embodying a second modified form of the present invention;

Fig. 16 is a sectional view taken on the line 16—16 of Fig. 14; and

Fig. 17 is a sectional view taken on the line 17—17 of Fig. 15.

The reference character 10 is applied in Fig. 1 to an automobile frame including side members 11 and an X having rear legs 12. The rear end of each side member 11 is inwardly offset as indicated at 13. Tie pieces 14 connect the legs of the X and the side members 11 immediately adjacent the offset rear ends 13. A member 15 is secured to each side member 11 in opposed spaced relation to the rear offset portion 13. As seen in Fig. 7 a bolt 16 ties each member 15 and the offset portion 13 together, a washer 17 and a nut 18 being on one end of the bolt. Mounted upon the bolt 16 is a pair of flanged circular members 19 to which is secured as by soldering or welding an extended cylinder 20. A ring 21 is secured as by soldering or welding to one end of the cylinder 20 and carries a circular series of openings 22 through two of which openings bolts 23 extend to secure the cylinder 20 to the offset portion 13 of each side member 11. There are nuts 24 on the ends of the bolts 23. To the exterior surface of the cylinder 20 is bonded an extended rubber annulus 25 having at a mid section an external peripheral groove 26 which provides a thin wall at this region. Ends 27 of the rubber annulus 25 slope outwardly toward an imaginary plane traversing the mid region of the rubber annulus 25 so that the length of the external periphery of the rubber annulus is less than that of the internal periphery. A pair of short cylinders or rings 28 is bonded to the external periphery or exterior of the rubber annulus 25 in spaced relation to one another at opposite sides of the groove 26. Rings 29 are secured as by soldering or welding to the inner ends of the short cylinders 28. As seen in Fig. 4 one side of the rings 29 is larger than the other side and an arcuate bifurcated end 30 of an arm 31 is received between the larger portions of the rings 29 and is secured thereto by bolts 32 and nuts 33. The arm 31 extends rearwardly from the rubber annulus 25 and has a rear end 34 projecting into a hollow bracket 35 and attached thereto by a bolt 36 and a nut 37. As seen in Fig. 11 the rear end 34 carries a bushing 38 secured thereto as by soldering or welding, which receives a holding element 39 retaining a rubber bushing 40. A sleeve 41 has a central ball or spherical portion 42 tightly fitted within the rubber bushing 40. The sleeve 41 is mounted upon a bolt 36.

As also shown in Fig. 11 a member 43 is secured to the lower end of the bracket 35 as by soldering or welding and passes therethrough and carries a pair of rubber bushings 44 upon an outer reduced portion 45 which is exterior of the bracket 35. A nut 46 retains the bushings 44 upon the reduced portion 45. A washer 47 separates one bushing 44 from the nut 46, and a washer 48 separates the other bushing 44 from a shoulder 49 formed between the reduced portion 45 and the remainder of the member 43. Mounted upon the bushings 44 is an eye part 50 attached to the lower end of a shock absorber 51 of the axial type. The shock absorber 51 carries at its upper end an eye part 52 as shown in Figures 1 and 3. The eye part 52 is mounted in rubber bushings 52ᵃ mounted upon a reduced portion 52ᵇ of a member 53 projecting from a vertical channel 54 secured to one rear leg 12 of the X by rivets 54ᵃ. A nut 54ᵇ retains the bushings 52ᵃ upon the reduced portion 52ᵇ. A washer 54ᶜ separates one bushing 52ᵃ from the nut 54ᵇ and a washer 54ᵈ separates the other bushing 52ᵃ from a shoulder 54ᵉ upon the member 53. The very rear end of the offset portion 13 of the side member 11 is secured to the leg 12 of the X at and adjacent the channel 54.

As shown in Fig. 1, there are two brackets 35, one at each end of an axle housing 55. As seen in Figs. 4 and 10, each bracket 35 partially embraces an end of the axle housing 55 and depends therefrom. Each bracket is secured to the axle housing as by soldering or welding. The axle housing carries a driving axle 56 to the ends of which are connected rear ground wheels 57. The axle housing 55 has at an intermediate section an expanded banjo portion 58 to which is secured by bolts 59 and nuts 60, a casting 61 adapted to support the rear end of a driving shaft or torque tube 62 projecting into the banjo portion 58 of the axle housing 55 for connection therewith through the usual differential gears. As shown in Fig. 10, the casting 61 has upper and lower pairs of spaced portions 62 between which are secured bolts 64. Upon each bolt 64 is mounted a sleeve 65 upon which is mounted a pair of rubber bushings 66. Each pair of rubber bushings is received in an opening 67, one in each of bifurcated divergent extremities 68 at the rear end of a torque member 69. The forward end of the torque member 69 has secured thereto by rivets 70 an element 71 having a reduced cylindrical portion 72 upon which is mounted a sleeve 73 retained thereon by a washer 74 and a nut 75 upon a threaded portion 76 at the end of the element 71. The sleeve 73 is bonded to the interior of a rubber annulus 77 to the exterior of which is bonded a ring 78 secured by soldering or welding within a short cylinder 79 secured to a bracket 80. The bracket 80 is secured by bolts 81 and nuts 82 to an upper side 83 and a lower side 84 of one leg 12.

Figs. 1, 5, and 9 show a diagonal strut 85 extending between one leg 12 and the torque member 69. The diagonal strut 85 is formed of tubes 86 and 87 flexibly connected to one another by means of an extended rubber cylinder 88. A tubular section 89 is bonded to the exterior of the rubber cylinder 88 and is secured about an end of the tube 87 by means of a bolt 90 and a nut 91. A tubular section 92 is bonded to the interior of the rubber annulus 88 and is secured within an end of the tube 86 by means of a bushing 93, a bolt 94, and a nut 95. The tubular section 92 has at one end slots 96 through which the bolt 90 extends. The tube 87 carries at one end a fitting 96 having a slightly conical opening 97. As seen in Fig. 9 a slightly conical portion 98 of a member 99 fits tightly within the opening 97, the member 99 being secured to the fitting 96 by a nut 100 on a threaded portion 101. The member 99 has a ball or spherical end 102 tightly fitting within a rubber bushing 103 carried in a retaining member 104 mounted in a short sleeve 105 secured as by soldering or welding within the torque member 69. The end of the tube 86 carries a similar member 96 with a similar opening 97 for connection of the tube 86 to the leg 12.

In operation of the chassis just described load is transmitted to the chassis and is transmitted as twisting or a turn in the rubber annulus 25 and through the arms 31 to the rear axle housing 55. Since the connection of the arms 31 to the rear axle housing 55 is at regions below the axle housing 55 and the centerline thereof in the depending brackets 35, there is a twist exerted upon the axle housing 55 acting in a counterclockwise direction as viewed in Fig. 4. This twist is in opposition to the twist effected upon the axle housing as a result of torque reaction due to the application of force by the axle 56 and the wheels 57 acting through the axle housing 55 and the arms 31 to propel the car forwardly. This latter torque reaction acts in a clockwise direction so that the two torque reactions subtract from one another. The torque reaction set up upon the axle housing 55 by braking applied to the wheels 57 also acts in a clockwise direction and this acts in opposition to the counterclockwise direction of twist upon the axle housing due to the load.

Since the arms 31 are connected below the axle housing 55 in the depending brackets 34, application of force by the axle 56 and the wheels 57 to move the car forwardly causes a twist to be exerted upon the bushings 40 and the sleeves 41 and 38 which might do some harm at this region and wear out the connecting parts. However, this is prevented by the torque member 69 which is connected to the axle housing 55 through its bifurcated extremity 68 and the casting 61 attached at the banjo portion 58 of the axle housing. As the axle housing tends to move angularly in a counterclockwise direction, as viewed in Fig. 4, about the bolts 36 as an axis, tendency of an angular movement is transmitted to the torque member 69 by virtue of its two-point connection with the axle housing 55 in its divergent extremity 68. Any angular movement of the torque member 69 is resisted through the connection of its forward end by the rubber bushing 77 in the bracket 80 secured to the one leg 12. There is, of course, not much strain exerted at this region since it is at a considerable distance from the point at which the force is exerted. The rubber bushing 77 permits any necessary lengthwise movement of the torque member 69 in response to angular movement of the arms 31 about the rubber annuli 25. The diagonal strut 85 resists movement of the axle housing 55 transverse of the chassis 10, while permitting some up-and-down movement of the torque member 69 as the axle housing 55 moves up and down, by virtue of the construction of the diagonal member 85 as shown and described with reference to Fig. 4. The tubes 86 and 87 of the diagonal strut 85 may twist with respect to one another about the rubber cylinder 88 and the connection of the tubes 86 and 87 to the leg 12 and the torque member 69 by the ball portion 102 and the rubber bushings 103 permit angular movement of the tubes with respect to the leg 12 and the torque member 69.

In the modification of Figs. 12 and 13 the rubber annulus 25 has short cylindrical members or rings 106 bonded to its exterior at opposite sides of the groove 26, to the outer ends of which are secured rings 107. An arm 108, which has an appreciable width and depth as viewed in Figs. 12 and 13 and may conveniently be hollow, has a forward arcuate end 109 secured by bolts 110 to the rings 107 secured to the outer ends of the rings 106 bonded to the rubber annulus 25. The rear end of the arm 108 is connected by a bolt 36 to a depending bracket 35 on an axle housing 55 in the same manner as the rear ends of arms 31 for the modification of Figs. 1 to 11. In the modification of Figs. 12 and 13 the diagonal strut is omitted for in certain constructions it provides too much lateral harshness. As a substitute therefor, there is provided a channel 111 faced with material 112 such as that used to line brake shoes. Any excessive transverse movement of the axle housing 55 causes contact between the facing 112 and the arm 108. The channel 111 secured to a bracket 113 secured in turn to one leg 12 of the frame at the connection of the rear offset end 13 of the side member 11. The rear end of the torque member 69 is connected to the casting 61 attached to the banjo portion 60 of the axle housing 55 by means of special bracket members 113. As shown in Fig. 14 the forward end of the torque member 69 is connected to the lower end of a shackle link 114 by means of a bolt 115 and a rubber bushing 116. The upper end of the shackle link 114 is connected by means of a bolt 117 and a rubber bushing 118 to a bracket 119 secured to one leg 12 of the X.

In the modification of Figs. 15, 16 and 17 there is provided a frame 120 of which only the rear portion of one side is shown. Frame 120 includes a side member 121 and a transverse member 122 secured to the side member 121 with a short bracing member 123 aiding the securement. The connection of the forward end of the torque member 69 is not shown. The rear end is connected in either the manner of modification of Figs. 1 to 11 or that of Figs. 12 to 14 to the casting 61. A shock absorber 124 is connected at its lower end to the depending bracket 35 secured to the axle housing 55 and its upper end to a member 125 projecting from the side member 121. As seen in Fig. 17 the side member 121 is formed of a sheet folded and overlapped as indicated at 126. Semi-circular flanged members 127 are secured by bolts 128 and nuts 129 to the side member 121. Semi-circular members 130 are secured by bolts 131 to the semi-circular members 127 and carry rings 132 within which are mounted and bonded rubber annuli 133. To each ring 132 is secured a key 134 as by soldering or welding which fits into a keyway 135 formed in each semi-circular member 130, the key 134 and the keyway 135 operating to prevent rotation of the ring 132 within the semi-circular members 127 and 130. The edges of the keys 134 are bent over about the semi-circular members 130 as indicated at 136 so as to retain the rings 132 and the associated rubber annuli 133 against transverse displacement. Within each rubber annulus 133 is bonded a short cylindrical member 137 having projections 138 formed at one end and fitting between projections 139 formed on the ends of opposed cylindrical portions 140 formed on an end of an arm 141. The projections 138 and 139 cooperate to prevent rotation of the arm 141 with respect to the rings 137 and the associated rubber annuli 133. Caps 142 fit within the opposed cylindrical portions 140 so as to prevent the entrance of dirt into these portions and into the arm 141 proper. The caps 142 are retained in position by a bolt 143 and a nut 144. The rear end of the arm 141 is connected to the depending bracket 35 on the end of the axle housing 55 in the same way as in the first two modifications. The rubber annuli 133 twists under application of load to the frame 120 in the same way as the rubber annuli of the previous modifications. The present modification differs from the previous modifications primarily in that the rubber annuli 133 are spaced from one another and so provide an increased lateral stability and the arm 141 is connected with an interior surface of the rubber annuli rather than with the exterior thereof. Likewise, the exteriors of the rubber annuli 133 rather than the interiors are connected with the frame. It will be understood, of course, that there are two units such as the one shown in Fig. 17, one at each side of the rear end of the frame 120.

It will be apparent from the foregoing description that a new and novel frame construction has been provided for involving improvements in the connection to a frame to an axle housing or an axle. There are provided arms having resilient connections at one end with the frame. The resilient connections absorb the torque due to the load of the vehicle upon the frame. The other end of the arms is connected to and below a housing carrying a live axle. The connections below the axle cause the various torque reactions imposed upon the axle to subtract from one another, and thus their effect is minimized. The deleterious effects of twisting imposed on these connections is avoided by the use of a torque member connected at one end at two vertically spaced points to the axle housing and at the other end in a resilient mounting on the frame well spaced from the axle housing. The result is that any twist exerted upon the axle housing tends to move the torque member angularly, this tendency being resisted without strain by the connection of the torque member with the frame because of the spacing between the connection from the axle housing. The resilient connections of one end of the arms with the frame take special forms that cooperate with the connection of the other and of the arms with and below the axle housing and the use of the special torque member, in that these resilient connections are of greatly improved design and make feasible the entire arrangement. They include rubber-annulus means connected exteriorly and in interiorly with the frame and the arms. The rubber annulus means is of generally extended length and extends transversely of the frame so as to provide resistance to tilting and longitudinal twisting of the arms. It is considered that these resilient connections or mountings have patentable novelty independent of their use with arms connected to an axle housing containing a live or driving axle.

The intention is to limit the invention only within the scope of the appended claims.

The drawings show constructions involving frames that are distinct from vehicle bodies to be applied thereto. However, this is for the purpose of illustration, and it is to be understood that the invention may as well be applied to constructions in which the frame and the body are so associated that the frame is part of the body. It is intended that the term "frame" or "vehicle frame" as used in the claims cover both constructions.

I claim:

1. The combination with a vehicle frame, an axle housing extending transversely of the frame at the rear thereof, a driving axle mounted in the axle housing and ground wheels connected to the ends of the axle so as to be driven thereby and positioned at the sides of the frame; of depending brackets secured to the ends of the axle housing, arms connected at one end to the depending brackets below the axle housing, means connecting the other ends of the arms and regions of the frame forward of the axle housing in joints resilient resisting torsion of the arms with respect to the frame, each joint being formed of a rubber annulus of extended length as compared to thickness and having a thin mid section, means bonded to the inner surface of the rubber annulus and secured to the frame, and rings bonded to and surrounding the rubber annulus at opposite sides of the thin mid section and being secured by their inner ends to an end of an arm extending outwardly from directly opposite the thin mid section, and a torque member connected at one end to a mid section of the axle and at the other end to a region of the frame forward of the axle housing and between the sides of the frame.

2. The combination with a vehicle frame, an axle housing extending transversely of the frame at the rear thereof, a driving axle mounted in the axle housing and ground wheels connected to the ends of the axle so as to be driven thereby and positioned at the sides of the frame; of depending brackets secured to the ends of the axle housing, arms connected at one end to the depending brackets below the axle housing, means connecting the other ends of the arms and regions of the frame forward of the axle housing in joints resiliently resisting torsion of the arms with respect to the frame, each joint being formed of a rubber annulus of extended length as compared to thickness and having a thin mid section, means bonded to the inner surface of the rubber annulus and secured to the frame, and rings bonded to and surrounding the rubber annulus at opposite sides of the thin mid sections and being secured by their inner ends to an end of an arm extending outwardly from directly opposite the thin mid section, and a torque member connected at one end to a mid section of the axle and resiliently connected at the other end to a region of the frame forward of the connections of the arms with the frame and between the sides of the frame.

3. The combination with a vehicle frame, an axle housing extending transversely of the frame at the rear thereof, a driving axle mounted in the axle housing and ground wheels connected to the ends of the axle so as to be driven thereby and positioned at the sides of the frame; of depending brackets secured to the ends of the axle housing, arms connected at one end to the depending brackets below the axle housing, means connecting the other ends of the arms and regions of the frame forward of the axle housing in joints resiliently resisting torsion of the arms with respect to the frame, each joint being formed of a rubber annulus thin at a mid section and appreciably thicker at other sections so as to present two thick end portions joined by a thin mid portion, means bonded to the inner surface of the rubber annulus and secured to the frame, and means bonded to the exterior surfaces of the thick portions of the rubber annulus and secured to an arm extending outwardly from directly opposite the thin portion, and a torque member connected at one end to a mid section of the axle and at the other end to a region of the frame forward of the axle housing and between the sides of the frame.

4. The combination with a vehicle frame, an axle housing extending transversely of the frame at the rear thereof, a driving axle mounted in the axle housing and ground wheels connected to the ends of the axle so as to be driven thereby and positioned at the sides of the frame; of depending brackets secured to the ends of the axle housing, arms connected at one end to the depending brackets below the axle housing, means connecting the other ends of the arms and regions of the frame forward of the axle housing in joints resiliently resisting torsion of the arms with respect to the frame, each joint being formed of a rubber annulus thin at a mid section and appreciably thicker at other sections so as to present two thick end portions joined by a thin mid portion, means bonded to the inner surface of the rubber annulus and secured to the frame, and means bonded to the exterior surfaces of the thick portions of the rubber annulus and secured to an arm extending outwardly from directly opposite the thin portion, and a torque member connected at one end to a mid section of the axle and resiliently connected at the other end to a region of the frame forward of the connections of the arms with the frame and between the sides of the frame.

5. The combination with a vehicle frame and an axle; of arms connected at one end to the ends of the axle, and means connecting the other ends of the arms and regions of the frame forward of the axle in joints resiliently resisting torsion of the arms with respect to the frame, each joint being formed of a rubber annulus of extended length as compared to thickness and having a thin mid section, means bonded to the inner surface of the rubber annulus and secured to the frame, and rings bonded to and surrounding the rubber annulus at opposite sides of the thin mid section and being secured by their inner ends to an end of an arm extending outwardly from directly opposite the thin mid section.

6. The combination with a vehicle frame and an axle; of arms connected at one end to the ends of the axle, and means connecting the other ends of the arms and regions of the frame forward of the axle in joints resiliently resisting torsion of the arms with respect to the frame, each joint being formed of a rubber annulus thin at a mid section and appreciably thicker at other sections so as to present two thick end portions joined by a thin mid portion, means bonded to the inner surface of the rubber annulus and secured to the frame, and means bonded to the exterior surfaces of the thick portions of the rubber annulus and secured to an arm extending outwardly from directly opposite the thin portion.

7. The combination with a vehicle frame and an axle; of arms connected at one end to the ends of the axle at regions below the centerline of the axle, and means connecting the other ends of the arms and regions of the frame forward of the axle in joints resiliently resisting torsion of the arms with respect to the frame, each joint being formed of a rubber annulus of extended length as compared to thickness and having a thin mid section, means bonded to the inner surface of the rubber annulus and secured to the frame, and rings bonded to and surrounding the rubber annulus at opposite sides of the thin mid sections and being secured by their inner ends to an end of an arm extending outwardly from directly opposite the thin mid section.

8. The combination with a vehicle frame and an axle; of arms connected at one end to the ends of the axle at regions below the centerline of the axle, and means connecting the other ends of the arms and regions of the frame forward of the axle housing in joints resiliently resisting torsion of the arms with respect to the frame, each joint being formed of a rubber annulus thin at a mid section and appreciably thicker at other sections so as to present two thick end portions joined by a thin mid portion, means bonded to the inner surface of the rubber annulus and secured to the frame, and means bonded to the exterior surfaces of the thick portions of the rubber annulus and secured to an arm extending outwardly from directly opposite the thin portion.

9. The combination with a vehicle frame, an axle housing extending transversely of the frame at the rear thereof, a driving axle mounted in the axle housing and ground wheels connected to the ends of the axle so as to be driven thereby and positioned at the sides of the frame; of depending brackets secured to the ends of the axle housing, arms connected at one end to the depending brackets below the axle housing, means connecting the other ends of the arms and regions of the frame forward of the axle housing in joints resiliently resisting torsion of the arms with respect to the frame, each joint being formed of a rubber annulus of extended length as compared to thickness and having a thin mid section, means bonded to the inner surface of the rubber annulus and secured to the frame, and rings bonded to and surrounding the rubber annulus at opposite sides of the thin mid section and being secured by their inner ends to an end of a arm extending outwardly from directly opposite the thin mid section.

10. The combination with a vehicle frame, an axle housing extending transversely of the frame at the rear thereof, a driving axle mounted in the axle housing and ground wheels connected to the ends of the axle so as to be driven thereby and positioned at the sides of the frame; of depending brackets secured to the ends of the axle housing, arms connected at one end to the depending brackets below the axle housing, means connecting the other ends of the arms and regions of the frame forward of the axle housing in joints resiliently resisting torsion of the arms with respect to the frame, each joint being formed of a rubber annulus thin at a mid section and appreciably thicker at other sections so as to present two thick end portions joined by a thin mid portion, means bonded to the inner surface of the rubber annulus and secured to the frame, and means bonded to the exterior surfaces of the thick portions of the rubber annulus and secured to an arm extending outwardly from directly opposite the thin portion.

11. The combination with a vehicle frame and an axle; of arms connected at one end to the ends of the axle, and means connecting the other ends of the arms and regions of the frame forward of the axle in joints resiliently resisting torsion of the arms with respect to the frame, each joint being formed of a cylindrical member secured to the frame, a rubber annulus of extended length as compared to thickness surrounded and bonded to the exterior of the cylindrical member and having a thin mid section, rings bonded to and surrounding the rubber annulus at opposite sides of the thin mid section, flanges secured to the inner ends of the rings and being attached to an end of an arm extending outwardly from directly opposite the thin mid section.

12. The combination with a vehicle frame and an axle; of arms connected at one end to the ends of the axle, and means connecting the other ends of the arms and regions of the frame forward of the axle in joints resiliently resisting torsion of the arms with respect to the frame, each joint being formed of a cylindrical member secured to the frame, a rubber annulus of extended length as compared to thickness surrounded and bonded to the exterior of the cylindrical member and having a thin mid section, rings bonded to and surrounding the rubber annulus at opposite sides of the thin mid section, flanges secured to the outer ends of the rings and being attached to an end of an arm extending outwardly from directly opposite the thin mid section.

13. The combination with a vehicle frame and an axle; of arms connected at one end to the ends of the axle, and means connecting the other ends of the arms and regions of the frame forward of the axle in joints resiliently resisting torsion of the arms with respect to the frame, each joint being formed of a cylindrical member secured to the frame, a rubber annulus of extended length as compared to thickness surrounded and bonded to the exterior of the cylindrical member, ring means bonded to and surrounding the rubber annulus, flanges secured to the inner ends of the ring means and being attached to an end of an arm extending outwardly from directly between the ends of the annulus.

14. The combination with a vehicle frame and an axle; of arms connected at one end to the ends of the axle, and means connecting the other ends of the arms and regions of the frame forward of the axle in joints resiliently resisting torsion of the arms with respect to the frame, each joint being formed of a cylindrical member secured to the frame, a rubber annulus of extended length as compared to thickness surrounded and bonded to the exterior of the cylindrical member, ring means bonded to and surrounding the rubber annulus, flanges secured to the outer ends of the ring means and being attached to an end of an arm extending outwardly from directly between the ends of the annulus.

15. The combination with a vehicle frame and an axle; of arms connected at one end to the ends of the axle, and means connecting the other ends of the arms and regions of the frame forward of the axle in joints resiliently resisting torsion of the arms with respect to the frame, each joint being formed of a pair of rubber annuli spaced from one another in axial alignment, means bonded to the outer surfaces of the rubber annuli and secured to the frame, and means bonded to the inner surfaces of the rubber annuli and secured to an arm extending outwardly from between the rubber annuli.

16. The combination with a vehicle frame and an axle; of arms connected at one end to the ends of the axle, and means connecting the other ends of the arms and regions of the frame forward of the axle in joints resiliently resisting torsion of the arms with respect to the frame, each joint comprising rubber-annulus means formed of a pair of axially spaced portions and having inner and outer peripheries, means bonded to one periphery and secured to the frame, and means bonded to the other periphery and secured to an arm extending outwardly from between the ends of the rubber-annulus means.

17. The combination with a vehicle frame, an axle housing extending transversely of the frame at the rear thereof, a driving axle mounted in the axle housing and ground wheels connected to the ends of the axle so as to be driven thereby and positioned at the sides of the frame; of arms connected at one end to the ends of the axle housing at regions below the centerline of the axle housing, means connecting the other ends of the arms and regions of the frame forward of the axle housing in joints resiliently resisting torsion of the arms with respect to the frame, each joint comprising rubber-annulus means formed of a pair of axially spaced portions and having inner and outer peripheries, means bonded to one periphery and secured to the frame, and means bonded to the other periphery and secured to an arm extending outwardly from between the ends of the rubber-annulus means, and a torque member connected at one end to a mid point of the axle housing and at the other end to a region of the frame forward of the axle housing.

18. The combination with a vehicle frame, an axle housing extending transversely of the frame at the rear thereof, a driving axle mounted in the axle housing and ground wheels connected to the ends of the axle so as to be driven thereby and positioned at the sides of the frame; of arms connected at one end to the ends of the axle housing, and means connecting the other ends of the arms and regions of the frame forward of the axle housing in joints resiliently resisting torsion of the arms with respect to the frame, each joint comprising rubber-annulus means having an extended length in comparison with its thickness and inner and outer peripheries, means bonded to one periphery and secured to the frame, and means bonded to the other periphery and secured to an arm extending outwardly from between the ends of the rubber-annulus means.

19. The combination with a vehicle frame, an axle housing extending transversely of the frame at the rear thereof, a driving axle mounted in the axle housing and ground wheels connected to the ends of the axle so as to be driven thereby and positioned at the sides of the frame; of arms connected at one end to the ends of the axle housing at regions below the centerline of the axle housing, means connecting the other ends of the arms and regions of the frame forward of the axle housing in joints resiliently resisting torsion of the arms with respect to the frame, each joint comprising rubber-annulus means having an extended length in comparison with its thickness and inner and outer peripheries, means bonded to one periphery and secured to the frame, and means bonded to the other periphery and secured to an arm extending outwardly from between the ends of the rubber-annulus means, and a torque member connected at one end to a mid point of the axle housing and at the other end to a region of the frame forward of the axle housing.

20. The combination with a vehicle frame, an axle housing extending transversely of the frame at the rear thereof, a driving axle mounted in the axle housing and ground wheels connected to the ends of the axle so as to be driven thereby and positioned at the sides of the frame; of arms connected at one end to the ends of the axle housing, means connecting the other ends of the arms and regions of the frame forward of the axle housing in joints resiliently resisting torsion of the arms with respect to the frame, a torque member connected at one end to a midsection of the axle and at the other end to a region of the frame forward of the axle housing and between the sides of the frame, and a stiffening strut connected at one end to a region of the torque member between its ends and at its other end to the frame.

21. The combination with a vehicle frame, an axle housing extending transversely of the frame at the rear thereof, a driving axle mounted in the axle housing and ground wheels connected to the ends so as to be driven thereby and positioned at the sides of the frame; of arms connected at one end to the ends of the axle housing at regions below the centerline of the axle housing, means connecting the other ends of the arms and regions of the frame forward of the axle housing in joints resiliently resisting torsion of the arms with respect to the frame, a torque member connected at one end to a mid section of the axle and at the other end to a region of the frame forward of the axle housing and between the sides of the frame, and a stiffening strut connected to the frame and the torque member for resisting lateral movement of the torque member with respect to the frame.

22. In the combination specified in claim 21, the stiffening strut being formed of a first member, a second member having an end inserted in an end of the first member, and rubber spring means between the said ends of the members permitting them relative movement.

23. In the combination specified in claim 21, the stiffening strut being formed of a first element connected at one end to the frame, a second element connected at the other end to the torque member, an elongated rubber annulus, a tubular section bonded to the exterior of the rubber annulus and surrounding and secured to the other end of one element, and a part bonded to the interior of the rubber annulus and extending within and secured to the other end of the other element.

24. In the combination specified in claim 21, the stiffening strut being formed of a pair of elements, a rubber annulus secured by a bond of its exterior to one end of one element and by a bond of its interior to one end of the other element, the combination further comprising means connecting the other end of one of the elements to the torque member, including a part secured to the said other end of the said one of the elements and having a spherical portion and a rubber bushing surrounding the spherical portion and set within the torque member.

25. The combination with a vehicle frame, an axle housing extending transversely of the frame at the rear thereof, a driving axle mounted in the axle housing and ground wheels connected to the ends of the axle so as to be driven thereby and positioned at the sides of the frame; of hollow depending brackets secured to the ends of the axle housing, arms having one end extending into the hollow brackets and connected thereto below the axle housing, transverse pins secured to and extending through and protruding from the brackets at regions below the connections of the arms to the brackets, and shock absorbers connected to the frame and to the pins outside the brackets.

26. The combination with a vehicle frame, an axle housing extending transversely of the frame at the rear thereof, a driving axle mounted in the axle housing and ground wheels connected to the ends of the axle so as to be driven thereby and positioned at the sides of the frame; of arms connected at one end to the ends of the axle housing, at regions below the centerline of the axle housing, means connecting the other ends of the arms and regions of the frame forward of the axle housing in joints resiliently resisting torsion of the arms with respect to the frame, and shock absorbers connected to the frame and the ends of the axle housing below the connections of the arms with the axle housing.

27. The combination with a vehicle frame, an axle housing extending transversely of the frame at the rear thereof, a driving axle mounted in the axle housing and ground wheels connected to the ends of the axle so as to be driven thereby and positioned at the sides of the frame; of depending brackets secured to the ends of the axle housing, arms connected at one end to the depending brackets below the axle housing, means connecting the other ends of the arms and regions of the frame forward of the axle housing in joints resiliently resisting torsion of the arms with respect to the frame, and shock absorbers connected to the frame and the depending brackets below the connections of the arms with the depending brackets.

28. The combination with a vehicle frame, an axle housing extending transversely of the frame at the rear thereof, a driving axle mounted in the axle housing and ground wheels connected to the ends of the axle so as to be driven thereby and positioned at the sides of the frame; of arms connected at one end to the ends of the axle housing, means connecting the other ends of the arms and regions of the frame forward of the axle housing in joints resiliently resisting torsion of the arms with respect to the frame, each joint being formed of a pair of axially spaced rubber annuli, rings bonded to the inner surfaces of the rubber annuli and having projections formed in their outer ends, the said other end of an arm being formed of oppositely directly cylindrical portions fitting within the rings and being provided with projections at the ends of the cylindrical portions fitting between the projections on the rings to prevent relative rotation of the rings and the arm, and means bonded to the outer surfaces of the rubber annuli and secured to the frame.

29. The combination with a vehicle frame, an axle housing extending transversely of the frame at the rear thereof, a driving axle mounted in the axle housing and ground wheels connected to the ends of the axle so as to be driven thereby and positioned at the sides of the frame; of arms connected at one end to the ends of the axle housing, means connecting the other ends of the arms and regions of the frame forward of the axle housing in joints resiliently resisting torsion of the arms with respect to the frame, each joint being formed of rubber-annulus means, a ring bonded to the inner surface of the rubber-annulus means and having projections at one end, the said other end of an arm having projections fitting between the projections on the ring to prevent relative rotation between the ring and the arm, and means bonded to the outer surface of the rubber-annulus means and secured to the frame.

30. The combination with a vehicle frame, an axle housing extending transversely of the frame at the rear thereof, a driving axle mounted in the axle housing and ground wheels connected to the ends of the axle so as to be driven thereby and positioned at the sides of the frame; of arms connected at one end to the ends of the axle housing, means connecting the other ends of the arms and regions of the frame forward of the axle housing in joints resiliently resisting torsion of the arms with respect to the frame, each joint being formed of rubber annulus means, means securing the said other end of an arm to the inner surface of the rubber-annulus means, a first ring bonded to the outer surface of the rubber-annulus means, a key secured to the outer surface of the first ring, and a second ring secured to the frame and embracing the first ring and having a slot receiving the key, the slot and key preventing relative rotation of the rubber annulus means and the second ring.

31. The combination with a vehicle frame, an axle housing extending transversely of the frame at the rear thereof, a driving axle mounted in the axle housing, and ground wheels connected to the axle so as to be driven thereby; of arms connected to regions of the axle housing spaced lengthwise thereof and below the centerline thereof, and means connecting the other ends of the arms and regions of the frame forward of the axle in joints resiliently resisting torsion of the arms with respect to the frame, each joint being formed of a pair of rubber annuli spaced from one another in axial alignment, means bonded to the outer surfaces of the rubber annuli and secured to the frame, and means bonded to the inner surfaces of the rubber annuli and secured to an arm extending outwardly from between the rubber annuli.

GLENN H. PARKER.